Sept. 10, 1940.   F. L. BISHOP ET AL   2,214,158
MANUFACTURE OF LAMINATED GLASS
Filed Dec. 1, 1936   4 Sheets-Sheet 2

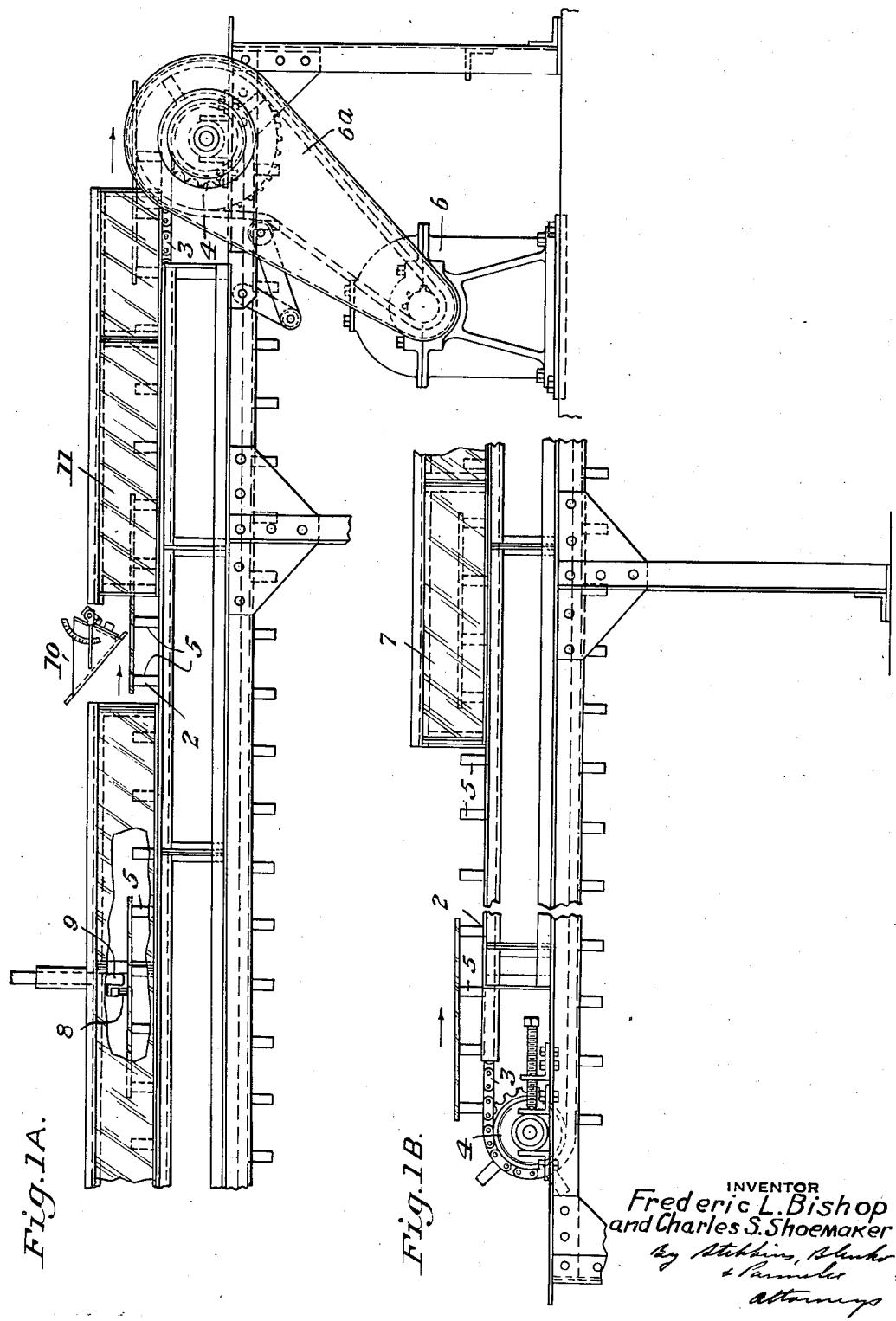

INVENTOR
Frederic L. Bishop
and Charles S. Shoemaker

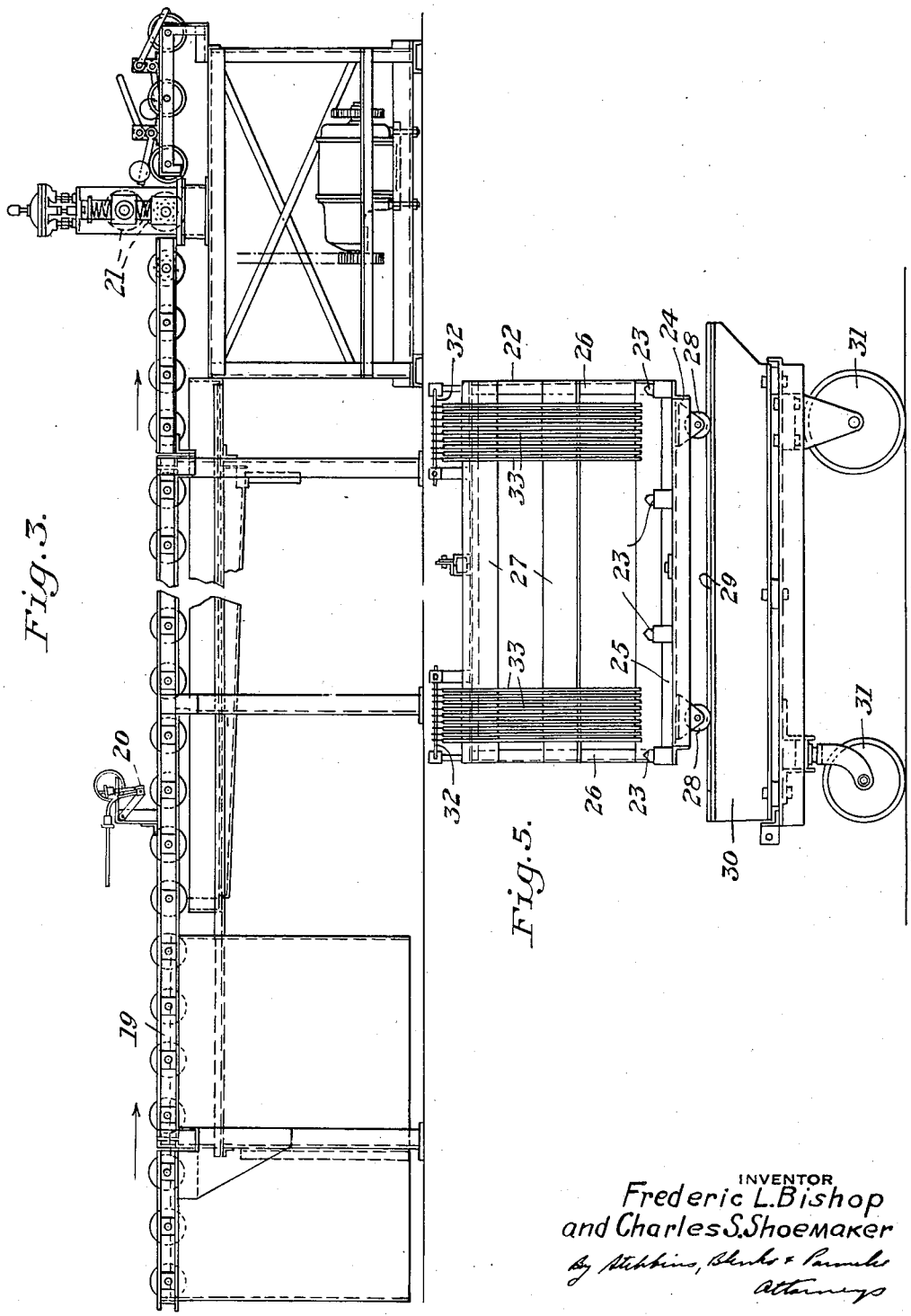

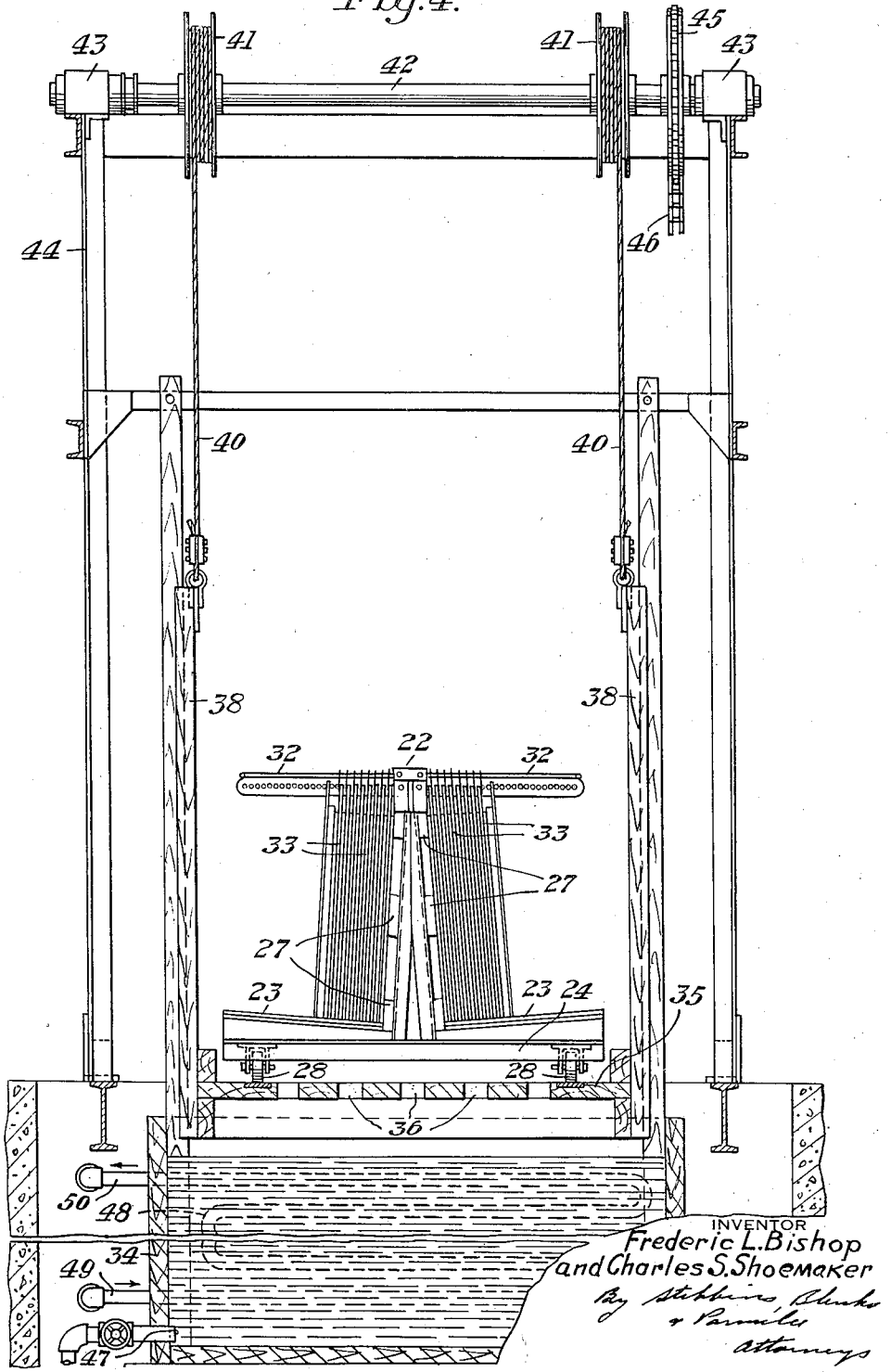

Patented Sept. 10, 1940

2,214,158

UNITED STATES PATENT OFFICE 2,214,158

MANUFACTURE OF LAMINATED GLASS

Frederic L. Bishop, Fox Chapel Manor, and Charles S. Shoemaker, Jeannette, Pa., assignors to American Window Glass Company, Pittsburgh, Pa., a corporation of Pennsylvania Application December 1, 1936, Serial No. 113,622

4 Claims. (Cl. 49—81)

The present invention relates to the manufacture of laminated glass. The present invention is particularly applicable to and useful in the manufacture of laminated glass by what may be termed the liquid process; that is, a process wherein the strengthening material in solution is flowed on the glass sheets to be united to form the composite product, dried thereon, and the composite product thereafter formed with the coatings on the glass sheets in juxtaposed relationship. It will be understood, however, that our invention is not necessarily limited to the liquid process, as it may be applied to processes other than the liquid process as it is defined above.

Heretofore practically all, and even at the present time, a substantial part of the commercial laminated glass is manufactured by interpositioning a preformed sheet of strengthening material between two glass sheets and uniting the glass sheets and the preformed sheet of strengthening material by the use of adhesives and also by subjecting the composite product to pressure in the presence of heat. The use of pressure and heat in such manufacture of laminated glass has always been deemed necessary even though adhesives were used to aid in effecting the union between the glass sheets and the sheet of strengthening material. The use of these high pressures and temperatures effected a satisfactory union between the glass sheets and the sheet of strengthening material where an adhesive was also used, but very substantial detrimental results have been occasioned by the usage of high pressures and temperatures. The high pressures and high temperatures utilized result in the setting up of strains in the finished product. Sometimes these strains are so great that breakage results even before the completion of the laminating operation. In other cases the strains are so great that breakage results immediately after the completion of the compositing operation and before the product is shipped. In other cases the strains do not let go and cause breakage until after the glass sheets have been packed and shipped, and in many cases the breakage does not occur until some time after the glass sheets are placed in use. In addition, the use of such high pressures and high temperatures as have heretofore been deemed absolutely essential in the manufacture of laminated glass, increases the cost of manufacture.

When the liquid process of laminating glass was first employed, it was deemed necessary to subject the sandwich formed of one filmed sheet and one unfilmed sheet, or of two similarly filmed sheets, to substantial pressures and temperatures in order to obtain proper adhesion between the component parts. While the temperatures and pressures heretofore employed in the compositing operation in the liquid process are materially less than those employed in the process embodying a preformed sheet, these pressures and temperatures have been of a very substantial character. For example, in the carrying out of a liquid process wherein the strengthening material is a polymerized ester of acrylic acid, during the compositing operation the composite product has been subjected to air heated to approximately 192° F. and at the same time subjected to pressure of from 20 to 50 lb. per sq. in. The product has been held under such conditions for a period of from 30 to 60 minutes. While these temperatures and pressures are considerably below those formerly utilized, they are sufficiently high to create detrimental conditions in the finished product; and it is the purpose and object of the present invention to provide a method of manufacturing laminated glass in such a way as to overcome the difficulties which have been encountered heretofore.

According to our invention, we provide a method of manufacturing laminated glass wherein it is unnecessary to subject the formed sandwich to pressure in effecting the satisfactory adhesion between the component parts of the sandwich. In accordance with the presently preferred method of practicing our invention, a film or layer of a solution of a strengthening material is formed on one face of each of the two glass sheets to be united together. The films or layers on the glass sheets are then dried by heating to drive off a substantial portion of the solvent. Thereafter, the films on the glass sheets are flooded with a contacting agent, which is a contacting agent for the particular strengthening material employed. Immediately after flooding the coatings on the glass sheets with the contacting agent, a sandwich is formed of the two coated and treated glass sheets with the coatings in juxtaposed relationship. Thereafter, the sandwich is passed between a pair of rolls or a wringer. This squeezes out from between the two coated glass sheets any excess contacting agent which may have been used in the immediately preceding operation. The shock resistance characteristics of the final product will vary materially if the excess contacting agent is permitted to remain between the coated glass sheets. For a short interval of time after passing through the wringer the coated glass sheets can be readily moved relative to each other. Complete adhesion takes place within a relatively short time thereafter.

In accordance with our invention, we propose to then place the composite product in a bath of heated liquid and we have found that it is preferable to have the composite product standing substantially vertically on an edge thereof when it is placed in the bath of heated liquid and during the period that it remains therein. Accordingly, as the composite product emerges from the so-called preliminary contacting rolls, we propose to place a plurality of the composite sheets on a truck in a substantially vertical position and to then place the truck into a bath of heated liquid preferably water, open to the atmosphere. It is preferably placed in the bath to sufficient extent to permit the bath to just cover the glass sheets. The composited sheets are permitted to remain in he bath of heated fluid for a period of from approximately 40 to 70 minutes, and then removed and permitted to cool down to a temperature which will permit of further handling of the product.

The fluid which we preferably use is water. Where water is used, the bath may be open to the atmosphere. In any event, the heated fluid to which the composite product is subjected must not be subjected to pressure, since the composite glass sheets should not be subjected to pressure while subjected to the action of the heated fluid.

We preferably maintain the temperature of the heated fluid at approximately 180° F. to approximately 212° F. A temperature of approximately 208° F. has been found to give very excellent results. Water is preferable to any other liquid or fluid by reason of the fact that appropriate temperatures can readily be maintained by merely keeping the water substantially at or just below the boiling point. The boiling point of water prevents the temperature from going sufficiently high to detrimentally affect the final product. Of course, it will be understood that various different temperatures will be used where different strengthening materials are used, but we have found that the above temperatures are highly satisfactory where a polymerized acrylic acid ester is used as the strengthening material.

The coated sheets forming each sandwich, immediately after being subjected to the above treatment, can be moved relative to each other; in other words, the one coated sheet can be readily slid over the other one. If the sandwiches, after being subjected to the above treatment, are permitted to stand in the atmosphere and to cool down to room temperature, the ease with which the two coated sheets can be slid relative to each other is materially lessened, but even after the sandwiches have been permitted to stand for a long period of time, some relative movement can still be effected if sufficient force is used.

We do not desire to be confined to any particular theory as to why a highly satisfactory product can be obtained by merely squeezing out the excess contacting agent by contacting rolls and then subjecting the sandwiches to the action of a heated fluid. However, we believe that by subjecting the sandwiches to the heated fluid, any strain which has been imparted to the product during the manufacturing process is eliminated. We believe that there is an annealing of the composite product whereby any strains which nay have been imparted to the strengthening material, or to the junction between the strengthening material and the glass sheets, or to the junction between the two layers of strengthening material during the manufacturing operation, are eliminated.

Full and complete tests, including shock resistance tests, boiling tests, uviarc light tests, and other aging tests, have been employed on the products resulting from the practice of our invention and such products have been found to be substantial improvements upon prior art products.

The particular advantages of the process above described flow from the elimination of the use of pressures in effecting the compositing of the coated glass sheets. By eliminating the use of pressure, the strains already in the composite product are not accentuated and additional strains imparted thereto; on the other hand, any strains which are in the product are eliminated. The elimination of the use of pressures also reduces the cost of manufacture materially.

It will be understood that in carrying out the process above described, it is not necessary to film and treat both sheets of glass which are used to form the sandwich, as the advantages of our invention can be obtained where but one of the glass sheets is coated, the coating dried thereon, and the coated sheet united to a similar uncoated sheet in the manner above described.

It will also be understood that the drying of the films on the glass sheets does not necessarily have to be carried to the point where all solvent is driven therefrom. We preferably carry out the drying operation to a sufficient extent to remove substantially all the solvent in the films.

In the accompanying drawings, we have shown for purposes of illustration only, apparatus which may be utilized in carrying out our invention.

Figures 1A and 1B are side elevational views of the apparatus which may be used for cleaning and filming the glass sheets;

Figure 3 is a side elevational view of the apparatus for flooding the coated sheets with the contacting agent and for effecting the preliminary contacting referred to above;

Figure 4 is an elevational view partly in section of the dip tank and the apparatus for lowering the glass sheets into the tank, a rack having a plurality of glass sheets thereon being shown in elevation in position on the lift platform; and Figure 5 is a side elevational view of the truck used for transporting the glass sheets to the dip tank and the rack for supporting the glass sheets.

Figure 2A:
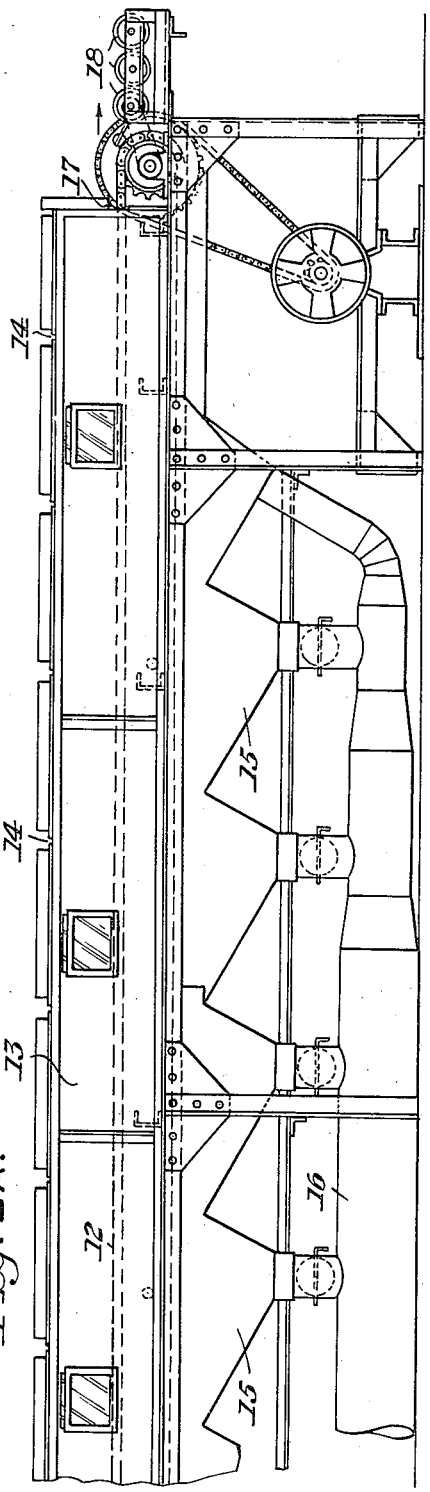
Figures 2A and 2B are side elevational views of the drying mechanism.

In carrying out our invention, the glass sheets to be coated or filmed are initially cleaned in order to remove any dirt or impurities on the face of each sheet to be coated. Thereafter, as shown in Figures 1A and 1B, the cleaned sheets are placed on the horizontally disposed conveying mechanism indicated generally by the reference character 2. This conveying mechanism is of the continuous type provided with continuous chains 3 on opposite sides thereof which pass around sprocket wheels 4 located at each end of the conveyor. The chains are provided with supporting blocks 5 adapted to support the glass sheets in a substantially horizontal position. The sprocket wheels 4 are arranged to be driven by means of a motor 5 through appropriate connections indicated generally by the reference character 6. As the conveyor advances, the glass sheets pass into the enclosed chamber 7 which is provided with a brush 8 adapted to extend downwardly to the level of the glass sheets and to brush the glass sheets as they are carried past the brush in order to remove any dust or foreign matter which may have remained on the surfaces thereof even after the washing above referred to. Adjacent the brush 8, a plurality of downwardly extending nozzles 9 are provided for exhausting air from the chamber 7 from adjacent the glass sheets so as to create a substantial suction adjacent the glass sheets as they are carried past the nozzles in order to remove any dust or foreign particles which are on the surface of the sheets and which may have been loosened by the action of the brush 8.

As the conveyor continues, the glass sheets pass beneath a flow machine or forming feeder 10 which is adapted to form a film and flow the formed film on the glass sheets as they are carried past the flow machine by the conveyor. The film as it is flowed on the glass sheets is preferably wider than the glass sheets so that they will be covered relatively uniformly from edge to edge in the filming operation. The flow characteristics of the solution of strengthening material are so controlled and regulated as to cause the excess material flowed over the edges of the glass sheets to cut off along the edges thereof, and appropriate pans are provided below the conveying mechanism in order to catch the excess strengthening material so that it can be returned for reuse.

The strengthening material which I preferably employ is a polymerized ester of acrylic acid. The solvent employed with such a strengthening material is preferably ethylene dichloride and the viscosity of the solution as it is flowed on the glass sheets is preferably approximately 50 to 60 poises.

After the film has been formed on the glass sheets in the manner above described, they pass into the enclosed chamber 11 which is provided in order to prevent dust or other foreign matter in the air from immediately contaminating the wet film.

Figure 2B:
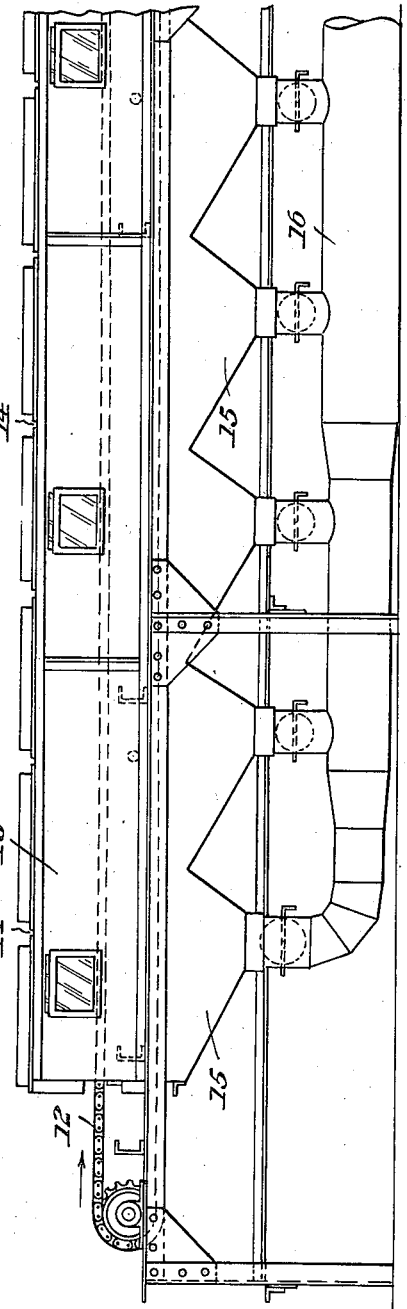

Thereafter, the coated glass sheets are removed from the discharge end of the conveying mechanism above described and either mechanically or manually placed on another conveyor indicated generally by the reference character 12, for carrying them through the drying chamber 13. The drying chamber 13 is preferably of considerable length so as to permit appropriate drying of the films on the glass sheets, as more fully described in the copending application of Frederic L. Bishop et al., Serial No. 106,780, filed October 21, 1936. For a detailed description of the drying mechanism shown in Figures 2A and 2B, reference is hereby made to the copending application of Frederic L. Bishop et al., Serial No. 669,740, now Patent No. 2,052,545. It will suffice here to state that the glass sheets are carried through the drying chamber by means of the conveyor 12 and dried by appropriate air circulation and electrical space heaters (not shown) spaced appropriately along the length of the drying chamber above the level of the conveying mechanism. Air enters the drying chamber through transversely extending openings 14 located at spaced intervals longitudinally of the drying chamber. The air passes downwardly past the space heaters and around the edges of the coated glass sheets and is removed through the bottom of the drying chamber by a plurality of transversely extending troughs 15 spaced longitudinally of the drying chamber. These troughs connect with a common header 16 extending longitudinally of the drying chamber and through which the air and the accompanying solvent evaporated from the coatings on the glass sheets are exhausted.

After the coatings on the glass sheets have been sufficiently dried, they pass outwardly through the discharge openings 17 on to a roll table 18 and from there are transferred either mechanically or manually to the roll table 19 shown in Figure 3. The glass sheets pass along the roll table 19 and beneath the contacting agent applicator 20, which is arranged to spray or flow sufficient contacting agent on the coatings of the glass sheets to flood them. Thereafter, the glass sheets continue along the roll table 19 and an operator forms a sandwich of two coated and treated sheets. The sandwich then continues along the roll table and an operator introduces the sandwich between a pair of rolls 21. One of the rolls is appropriately driven and apparatus (not specifically shown) is provided for subjecting the sandwich to at least sufficient pressure to squeeze out any excess contacting agent. The apparatus for providing the pressure is preferably automatic and arranged so that the initial contact between the rolls and the sandwich operates a valve which permits compressed air to operate against a diaphragm for exerting a predetermined pressure on the rolls, which pressure is in turn imparted to the assembled sandwich passing therebetween. The pressure employed on these rolls is not for the purpose of effecting a permanent union between the coatings on the glass sheets, but is primarily for the squeezing out of any excess contacting agent.

The contacting agent which we prefer when the strengthening material is a polymerized acrylic acid ester is dibutyl phthalate but it will be understood that any other suitable contacting agent may be employed. By "contacting agent" as that term is used in the specification we mean a liquid which is substantially devoid of adhesive characteristics and which will function primarily to exclude air from between the glass sheets during the contacting or compositing operation. The contacting agent preferably has a plasticizing effect upon the strengthening material in addition to functioning to exclude air from between the glass sheets.

After the assembled sandwich has been acted upon by the preliminary contacting rolls 21, the glass sheets may be readily slid relative to each other and care must be taken in order to maintain the two coated sheets in proper alignment at this stage of the process.

The assembled sandwiches are then stacked in a substantially vertical position on a rack 22. The rack 22 is provided with spaced parallel supporting bars 23, the top surfaces of which are sloped slightly toward the center of the rack. These supporting bars are mounted on a base frame 24 which is rectangular in shape and is provided with a centrally disposed member 25 for supporting the inner ends of the supporting bars 23. Vertically extending supports 26 are provided at each end of the frame extending vertically above the supporting bars, and these vertically extending supports are joined together by a plurality of horizontally extending supporting members 27. The main frame is mounted on wheels 28 which are adapted to cooperate with the tracks 29 mounted on the truck 30. The truck 30 is also provided with wheels 31 to permit movement of the truck and rack.

At the top of the rack and at each end and each side thereof, there is provided a substantially U-shaped bar 32, each of which is provided with a plurality of paddles 33 for spacing the glass sheets as they are mounted on the rack.

After the glass sheets have been placed on the rack in a substantially vertical position, the rack is transported by means of the truck 30 to the dip vat 34, which may be located adjacent the discharge end of the roll table 19. The dip vat 34 is provided with a vertically reciprocable platform 35 for supporting the glass supporting rack 22. As shown in the drawings, the platform is movable to a position above the floor level so that the tracks mounted thereon may be brought into alignment with the tracks on the truck 30, and so that the glass supporting racks may be moved from the tracks on the truck 30 to the tracks on the platform 35.

The platform 35 is provided with a plurality of longitudinally extending openings 36 in order to permit the platform 35 to be moved downwardly into the vat and in order to permit the liquid therein to flow freely about the glass sheets mounted on the rack.

The platform 35 is provided with upwardly extending supporting members 38 which cooperate with guides extending downwardly into the bath and upwardly above the surface thereof. Hoisting ropes 40 are connected to the supporting members 38 at the upper ends thereof and pass around drums 41 mounted on a shaft 42 journaled in appropriate bearings 43 carried by the frame 44 which extends upwardly around the dip vat and platform and supporting guides. A sprocket wheel 45 is also mounted on the shaft 42 and is driven by a sprocket chain 46 appropriately connected to a driving motor (not shown).

A drain opening 47 is provided in the base of the dip vat for permitting the draining of the vat as desired. The dip vat is also provided with a steam coil 48 having an inlet connection 49 and an outlet connection 50. The water in the dip vat is heated to the desired temperature by the steam coil 48 which is connected by the inlet and outlet 49 and 50 to an appropriate steam supply.

After the glass sheets have been placed on the rack and the rack placed in position on the platform of the dip vat, the platform is lowered into the vat to a sufficient extent to permit the water to just cover the glass sheets. It is only necessary that the top edge of each glass sheet be immersed below the surface of the water. The rack with the glass sheets thereon is permitted to remain in the dip vat for a period of approximately 40 to 70 minutes and the temperature of the water is maintained at approximately 180° F. to 212° F.

Thereafter, the rack is raised from the dip vat and removed from the platform and permitted to stand for a sufficient period of time to permit the glass sheets to cool down to a temperature at which they may be safely and satisfactorily handled.

While we have shown and described apparatus which may be utilized in carrying out our invention, the invention is not limited thereby, but may be otherwise practiced within the scope of the appended claims.

We claim:

1. In the manufacture of laminated glass, the steps comprising forming a film of a solution of a strengthening material on a glass sheet, drying the film on the glass sheet, thereafter treating the film with a contacting agent, forming a sandwich of the coated sheet and a second glass sheet with the strengthening material therebetween, subjecting the sandwich to at least sufficient pressure to squeeze out any excess contacting agent, thereafter immersing the sandwich in a liquid bath heated to approximately 180° F. to 212° F. while maintaining the bath at substantially atmospheric pressure and permitting it to remain therein for a sufficient period of time to effect adhesion of the parts, and thereafter removing the sandwich from the bath.

2. In the manufacture of laminated glass, the steps comprising forming a film of a solution of a strengthening material on a glass sheet, drying the film on the glass sheet, thereafter treating the film with an excess of contacting agent, forming a sandwich of the coated sheet and a second glass sheet with the strengthening material therebetween, and subjecting the sandwich to at least sufficient pressure to squeeze out any excess contacting agent and to effect a preliminary contacting, thereafter placing the sandwich in a heated liquid bath while maintaining the bath at substantially atmospheric pressure, the bath being heated to a sufficient temperature and the sandwich being maintained in the bath for a sufficient period of time to permit annealing of the sandwich, and thereafter removing the sandwich from the bath.

3. In the manufacture of laminated glass, the steps comprising forming a film of a solution of a strengthening material on a glass sheet, drying the film on the glass sheet, thereafter treating the film with a contacting agent, forming a sandwich of the coated sheet and a second glass sheet with the strengthening material therebetween, subjecting the sandwich to at least sufficient pressure to squeeze out any excess contacting agent, thereafter placing the sandwich in a heated liquid bath while maintaining it in a substantially vertical position and while maintaining the bath at substantially atmospheric pressure, the bath being heated to a sufficient temperature and the sandwich being permitted to remain therein for a sufficient period of time to permit adjustment of the strengthening material between the glass sheets, and thereafter removing the sandwich from the bath.

4. In the manufacture of laminated glass, the steps comprising forming a film of a solution of a strengthening material on a glass sheet, drying the film on the glass sheet, thereafter treating the film with a contacting agent, forming a sandwich of the coated sheet and a second glass sheet with the strengthening material therebetween, subjecting the sandwich to at least sufficient pressure to squeeze out any excess contacting agent, thereafter placing the sandwich in a heated liquid bath while maintaining it in a substantially vertical position and while maintaining the bath at substantially atmospheric pressure, the bath being heated to approximately 180° F. to 212° F. and the sandwich being maintained therein for a sufficient period of time to permit annealing thereof, and thereafter removing the sandwich from the bath.

FREDERIC L. BISHOP.
CHARLES S. SHOEMAKER.